United States Patent
Park et al.

(10) Patent No.: US 9,301,122 B2
(45) Date of Patent: Mar. 29, 2016

(54) APPARATUS AND METHOD FOR ESTABLISHING A PERSONAL NETWORK FOR PROVIDING A CPNS SERVICE

(75) Inventors: Sung-Jin Park, Gyeonggi-do (KR); Wuk Kim, Gyeonggi-do (KR); Sung-Oh Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 495 days.

(21) Appl. No.: 12/906,665

(22) Filed: Oct. 18, 2010

(65) Prior Publication Data

US 2011/0090886 A1    Apr. 21, 2011

(30) Foreign Application Priority Data

Oct. 16, 2009 (KR) .................. 10-2009-0099002
Sep. 29, 2010 (KR) .................. 10-2010-0094793

(51) Int. Cl.
*H04L 12/28* (2006.01)
*H04W 8/00* (2009.01)
*H04W 4/20* (2009.01)

(52) U.S. Cl.
CPC .............. *H04W 8/005* (2013.01); *H04W 4/203* (2013.01)

(58) Field of Classification Search
CPC ........ H04L 12/16; H04L 12/28; H04W 4/203
USPC .......................................... 370/338; 709/219
See application file for complete search history.

(56) References Cited

U.S. PATENT DOCUMENTS

| 6,487,180 B1* | 11/2002 | Borgstahl et al. ............. 370/310 |
| 7,551,590 B2 | 6/2009 | Haller et al. |
| 2002/0123345 A1* | 9/2002 | Mahany ................ H04W 48/08 455/432.1 |
| 2003/0112789 A1* | 6/2003 | Heinonen et al. ............. 370/349 |
| 2005/0031109 A1* | 2/2005 | Fernandez et al. ....... 379/202.01 |
| 2005/0201301 A1* | 9/2005 | Bridgelall ..................... 370/254 |
| 2007/0078993 A1* | 4/2007 | Issa .............................. 709/229 |
| 2007/0110008 A1* | 5/2007 | Trift ...................... H04W 88/06 370/338 |
| 2007/0160192 A1 | 7/2007 | Horio et al. |

(Continued)

FOREIGN PATENT DOCUMENTS

| CN | 101223710 | 7/2008 |
| JP | 2002-290509 | 10/2002 |

(Continued)

OTHER PUBLICATIONS

Converged Personal Network Service Requirements, Open Mobile Alliance, Draft version 1.0, OMA-RD-CONS-V1_0-20090607-D, pp. 1-38, Jun. 7, 2009.*

(Continued)

*Primary Examiner* — Benjamin Lamont
(74) *Attorney, Agent, or Firm* — The Farrell Law Firm, P.C.

(57) ABSTRACT

Provided is an apparatus and a method for establishing a Personal Network (PN) by interconnecting a gateway device and various Consumer Electronics (CE) devices through a simple process in order to enable the CEs to receive various services. The method includes performing a physical pairing with surrounding devices by using Near Field Communication (NFC); finding a gateway device, which relays a service from the server, from among the paired devices; selecting a scheme for establishing a PN with the gateway device; and sending a request for connection with a PN according to the selected scheme to the found gateway device.

21 Claims, 4 Drawing Sheets

(56) References Cited

U.S. PATENT DOCUMENTS

| | | | |
|---|---|---|---|
| 2008/0056261 A1 | 3/2008 | Osborn et al. | |
| 2008/0062958 A1 | 3/2008 | Jonsson et al. | |
| 2008/0095126 A1* | 4/2008 | Mahany | H04W 48/08 370/338 |
| 2008/0311899 A1* | 12/2008 | Moriwaki et al. | 455/422.1 |
| 2009/0046677 A1* | 2/2009 | Toledano | H04L 12/5895 370/338 |
| 2009/0075592 A1* | 3/2009 | Nystrom et al. | 455/41.1 |
| 2009/0170511 A1* | 7/2009 | Takei | 455/435.1 |
| 2010/0029207 A1* | 2/2010 | Yang et al. | 455/41.3 |
| 2010/0138552 A1* | 6/2010 | Oh et al. | 709/229 |
| 2010/0188975 A1* | 7/2010 | Raleigh | 370/230.1 |
| 2010/0195539 A1* | 8/2010 | Tian et al. | 370/255 |
| 2010/0262696 A1* | 10/2010 | Oshiba | 709/227 |
| 2010/0273417 A1* | 10/2010 | Tian | H04M 1/6066 455/41.2 |
| 2010/0284390 A1 | 11/2010 | Lee et al. | |
| 2011/0116414 A1* | 5/2011 | Lee et al. | 370/254 |
| 2012/0072549 A1* | 3/2012 | Deprun | 709/219 |
| 2013/0196599 A1* | 8/2013 | Ramsten et al. | 455/41.1 |

FOREIGN PATENT DOCUMENTS

| | | | |
|---|---|---|---|
| JP | 2002-373130 | 12/2002 | |
| JP | 2003-061136 | 2/2003 | |
| JP | 2004-104531 | 4/2004 | |
| JP | 2005-507197 | 3/2005 | |
| JP | 2007-180824 | 7/2007 | |
| JP | 2008-503980 | 2/2008 | |
| JP | 4-179617 | 11/2008 | |
| JP | 2010-503276 | 1/2010 | |
| KR | 1020030033560 | 5/2003 | |
| KR | 1020070121455 | 12/2007 | |
| KR | 1020090066259 | 6/2009 | |
| KR | 1020100053714 | 5/2010 | |
| WO | WO 2007/004623 A1 * | 11/2007 | H04Q 7/38 |
| WO | WO 2008055418 A1 * | 5/2008 | |
| WO | WO 2009060863 A1 * | 5/2009 | |
| WO | WO 2009/078505 | 6/2009 | |

OTHER PUBLICATIONS

Chu, Youn-Sung, et al., Change Request for Additional Requirements for Group Service, Open Mobile Alliance, OMA-REQ-CPNS-2009-0044R03-CR, pp. 105, May 27, 2009.*
Lee, Jeonghoon, et al., Group Service, Change Request, Doc #OMA-REQ-CPNS-2008-0048R01, Dec. 8, 2008, pp. 1-3.*
Hjelm, Johan, et al., PNM and PNE Requirements for CPNS Consideration, Change Request, Doc#OMA-REQ-CPNS-2008-0037R01-CR-RD_PNM_UC_REQ, Dec. 16, 2008, pp. 1-9.*
English Translation of JP 200229059, cited on IDS, dated Sep. 23, 2014.*
Seung Gyun Oh, "OMA Converged Personal Network Service", Nov. 20, 2008.
Japanese Office Action dated Feb. 24, 2015 issued in counterpart application No. 2013-207795.

* cited by examiner

APPARATUS AND METHOD FOR ESTABLISHING A PERSONAL NETWORK FOR PROVIDING A CPNS SERVICE

PRIORITY

This application claims priority under 35 U.S.C. §119(a) to applications filed in the Korean Industrial Property Office on Oct. 16, 2009 and Sep. 29, 2010 and assigned Serial Nos. 10-2009-0099002 and 10-2010-0094793, respectively, the contents of which are incorporated herein by reference.

BACKGROUND OF THE INVENTION

1. Field of the Invention

The present invention relates generally to a Converged Personal Network Service (CPNS), in which a Consumer Electronics (CE) device accesses an external network and receives a service from the external network by using a communication function of a device capable of accessing an external network, and more particularly to an apparatus and a method for establishing a Personal Network (PN) with the CE devices by using a device capable of accessing an external network as a gateway.

2. Description of the Related Art

With the exponential increase of CE devices capable of performing Near Field Communication (NFC), such as MP3 players, Portable Multimedia Players (PMP), game players, and laptop computers (Notebooks), users are now pursuing a more convenient method for downloading content.

In general, a user finds content reproducible in a CE device, through the Internet, by using a Personal Computer (PC) and then downloads the content onto the PC. Thereafter, the CE is connected to the PC through a dedicated cable, and the CE device downloads the content from the PC. Only after performing this process, can the CE reproduce the corresponding content. Currently, the devices can share content by using a Bluetooth® scheme in place of a dedicated cable.

However, the methods, by which a CE device itself can directly access an external network, are still extremely limited. For example, some CEs can access an external network only when they can use the Internet via WiFi in an area including an Access Point (AP). Therefore, a necessity has emerged for a method by which devices (CEs) capable of performing an NFC but incapable of directly accessing an external network can access the external network through a gateway and use a desired service, such as content downloading. In an effort to meet such a necessity, the Open Mobile Alliance (OMA), for establishing application standards, has proposed a CPNS.

The CPNS refers to a service, in which a PN includes a gateway device, for communicating with an external network, and a CE device, for reproducing actual service and content. The CE device then accesses a service/content provider in the external network through the gateway and receives the service or content.

SUMMARY OF THE INVENTION

As described above, the main point of the CPNS scenario lies in that a gateway device intermediates a service request of a CE device and provides the requested service to the CE. To this end, it is necessary to establish a PN including various CEs and a central device functioning as a gateway, wherein the CEs can access a CPNS server through the gateway device. However, there has been no specific proposal for a way in which a plurality of CEs and a gateway device can establish a PN with each other and can register themselves in a CPNS server in order to provide a CPNS. Therefore, a method for establishing a PN by interconnecting a gateway device and various CEs through a simple process in order to enable the CEs to receive various services has become necessary.

An aspect of the present invention addresses at least the above-mentioned problems occurring in the prior art. Accordingly, an aspect of the present invention provides an apparatus and a method for establishing a PN by interconnecting a gateway device and various CEs through a simple process in order to enable the CEs to receive various services.

In accordance with an aspect of the present invention, there is provided a method of requesting for establishment of PN by a PN establishment requesting apparatus, the method including the steps of performing a physical pairing with surrounding devices by using Near Field Communication (NFC); finding a gateway device, which relays a service from the server, from among the paired devices; selecting a scheme for establishing a PN with the gateway device; and sending a request for connection with a PN according to the selected scheme to the found gateway device.

In accordance with another aspect of the present invention, there is provided a method of establishing a PN by a gateway device, the method including the steps of: receiving a PN connection request message from a single device among devices physically paired by using NFC; determining a PN establishment scheme included in the PN connection request message; and establishing a PN with at least one device among the paired devices based on the determined PN establishment scheme.

In accordance with another aspect of the present invention, there is provided a PN establishment requesting apparatus including: an NFC connection unit for performing a physical pairing with surrounding devices by using NFC; a PN establishment management unit for finding a gateway device from among the paired devices, selecting a scheme for establishing a PN with the gateway device, and sending a request for connection with a PN according to the selected scheme to the found gateway device.

In accordance with another aspect of the present invention, there is provided a gateway device including: a NFC connection unit for receiving a PN connection request message from a single device among devices physically paired by using NFC; and a PN establishment management unit for determining a PN establishment scheme included in the PN connection request message, and establishing a PN with at least one device among the paired devices based on the determined PN establishment scheme.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

Hereinafter, embodiments of the present invention will be described with reference to the accompanying drawings. In the following description, the same elements will be designated by the same reference numerals although they are shown in different drawings. Further, in the following description, a detailed description of known functions and configurations incorporated herein will be omitted when it may make the subject matter of the present invention rather unclear.

The following discussion will present embodiments of the present invention in order to achieve the technical objects described above. Further, in the following discussion, names of the entities defined in the CPNS of the Open Mobile Alliance (OMA), which is a standardization organization for applications of mobile terminals, are used as they are. However, it goes without saying that such standards and names do not limit the scope of the present invention and can be applied to systems having similar technical backgrounds.

The present invention provides a method for establishing a PN between at least one PNE and a gateway device in order to provide a CPNS. To this end, in a method according to the present invention, a PNE searches for a gateway device around the PNE and requests for connection to a PN when the gateway device is found. Further, the gateway device determines if the PN connection request is for an entire connection or for a 1:1 connection. When the PN connection request is for an entire connection, the gateway device searches for PNEs to be connected and acquires PNE information, generates a PN list by using the PNE information, and provides the generated PN list to a CPNS server, thereby completing the process of PN establishment and registration.

According to the present invention, a PNE, having requested a PN connection, can choose between all PNEs around itself receiving the CPNS and only itself receiving the CPNS. As a result, the PNE can use the CPNS by establishing a gateway device and a PN.

The method of establishing a PN according to the present invention as described above is not a series of processes simply bundling individual PNEs, but corresponds to a method that enables PNEs capable of performing only NFC to use a CPNS provided from an external network through a gateway device capable of accessing the external network.

Figure 1:
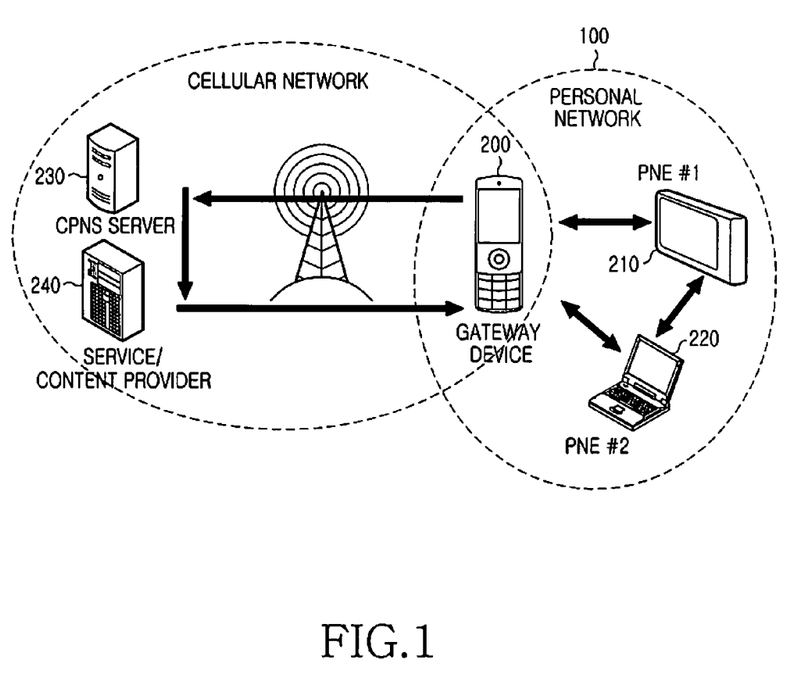
FIG. 1 illustrates a configuration of a CPNS system according to an embodiment of the present invention.

For more concrete understanding, elements and operations of a CPNS system according to an embodiment of the present invention will be described with reference to FIG. 1.

In general, a CPNS system according to an embodiment of the present invention includes one or more PNEs 210 and 220, a PN Gateway (GW) 200, a CPNS server 230, and a service/content provider 240 functioning as an application server.

PNE 210 corresponds to an electronic device, which directly provides a service to a user, such as an MP3 player, a PMP, a game player, a laptop computer (notebook), a navigation system, or other electronic devices including a home electronic appliance. These electronic devices receive content requested by a user from the service/content provider 240 and then reproduce the received content, thereby providing the service to the user. Since PNE 210 is equipped with an embedded NFC module, PNE 210 can perform NFC with PNE 220, which is another electronic device located near itself. However, since PNE 210 does not have a communication module capable of accessing an external network, such as a cellular network, PNE 210 cannot directly access a service provider. Therefore, PNE 210 performs a pairing with gateway device 200 in order to enable data communication with gateway device 200. Thereafter, PNE 210 establishes gateway device 200 and PN 100, so that PNE 210 can access the CPNS server 230 through gateway device 200, receive content provided by the service/content provider 240, and use the CPNS.

As used herein, the establishment of a PN refers to an establishment of a network between a PNE and a gateway device, so as to enable the PNE to identify functions of each physically paired device and receive a CPNS. To this end, a network based on an application for providing the CPNS is established by performing a process which includes determining whether the CPNS is supported between PNE 210 and gateway device 200; determining whether each device is a device capable of the CPNS through authentication and authorization; and identifying the role of each device, that is, determining if each device operates in a GW mode or a PNE mode. Through PN 100 established in the process described above, PNE 210 can access the CPNS server 230 of a provider network by using the communication function of gateway device 200. The PN 100 may include one gateway device 200 and multiple PNEs 210 and 220.

According to an embodiment of the present invention, since the PN 100 may include a plurality of PNEs 210 and 220, PNE 210 can select if it will establish a 1:1 PN including only PNE 210 and gateway device 200 or a PN including all surrounding PNEs.

Upon receiving a PN connection request including selection information selected as described above, gateway device 200 determines the selection information. When the request includes selection information requesting establishment of a PN including all surrounding PNEs, gateway device 200 searches for surrounding PNEs and performs an operation to establish a PN together with all found surrounding PNEs. Examples of the gateway device 200 include a mobile communication terminal, such as a portable phone, and a set-top box.

Gateway device 200 is capable of accessing a CPNS server 230 located in an external network, i.e. a provider network. Further, gateway device 200 performs a function of establishing a PN with a plurality of PNEs 210 and 220 and a function of relaying transmission of service/content and messages between the CPNS server 230 and PNE 210. That is, when PNE 210, having constructed a PN, requests for a service, gateway device 200 relays and delivers the request to the CPNS server 230. When the service/content provider 240 provides the requested service, gateway device 200 relays the service to PNE 210. Therefore, in the case of establishing a PN with a plurality of PNEs 210 and 220, gateway device 200 relays a service from the service/content provider 240 to the PNEs.

In addition to the functions described above, in a 1:1 PN establishment scheme, gateway device 200 performs a function of connecting a PN, managed by itself, with another PN, for the exchange of content between them. Although this function does not exactly coincide with the present invention, it is clear that a PN registration may be one implementation method for performing this function. However, this function will not be described in more detail because it does not exactly coincide with the present invention.

The CPNS server 230 registers and manages gateway device 200, the PNEs 210 and 220, and the PN, and processes a service or content request transferred through gateway device 200 from PNE 210. When the CPNS server 230 itself has the requested service/content, the CPNS server 230 provides the requested service/content to PNE 210 through gateway device 200. In contrast, when the CPNS server 230 does not have the requested service/content, the CPNS server 230 determines what is the requested service/content, and then transmits a message requesting the determined service/content to the service/content provider 240. Through this process, the CPNS server 230 causes the service/content provider 240 to provide the corresponding service/content, which users actually want to use, to PNE 210 through gateway device 200.

Figure 2:
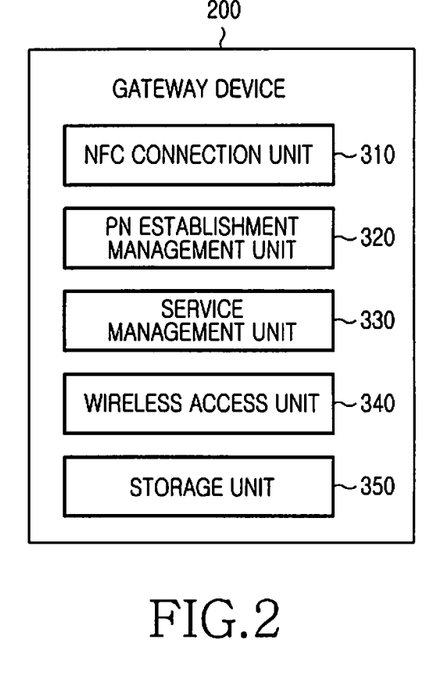
FIG. 2 is a block diagram illustrating an internal structure of a gateway device according to an embodiment of the present invention.

Hereinafter, a construction of the gateway device 200 as described above will be described with reference to FIG. 2. Referring to FIG. 2, gateway device 200 includes NFC connection unit 310, a PN establishment management unit 320 for establishing a 1:1 PN with PNE 210 or a PN including all surrounding PNEs, according to a PN connection request from PNE 210, a service management unit 330 for receiving a service requested by PNE 210 from the CPNS server 230 or the service/content provider 240 and delivering the service to PNE 210, a wireless access unit 340 for communicating with an external network, i.e. a communication with the CPNS server 230 or the service/content provider 240, and a storage unit 350 for storing information on a PNE having established a PN with gateway device 200.

Specifically, the PN establishment management unit 320 receives a search message for understanding the operation modes of the surrounding devices from PNE 210. Thereafter, the PN establishment management unit 320 creates and transmits a response notifying that the PN establishment management unit 320 itself operates as a gateway upon receiving the search message, and performs authentication/authorization of PNE 210 upon receiving a PN connection request from PNE 210.

Further, when receiving a PN connection request message from PNE 210, the PN establishment management unit 320 determines if selection information included in the PN connection request message indicates a 1:1 type of PN setup for establishment of a 1:1 PN with PNE 210 or an entire type of PN setup for establishment of a PN with all surrounding PNEs. As a result of the determination, in the case of the entire PN establishment scheme for establishment of a PN with all surrounding PNEs, the PN establishment management unit 320 performs a pairing with all the surrounding PNEs and performs an operation for the establishment of a PN with all the surrounding PNEs. As a result, a PN is not individually established between gateway device 200 and each PNE, and instead, a single PN is established between gateway device 200 and a plurality of PNEs 210 and 220 around the single gateway device 200 according to the present invention. As a result, since each PNE need not individually establish a 1:1 PN with gateway device 200 each time, it is possible to save network and device resources, such as battery power, etc.

When a PN has been established according to a PN connection request from PNE 210, the PN establishment management unit 320 registers PN inventory information in the CPNS server 230. The PN inventory information may be a PN list or a list of the PNEs belonging to one PN. Further, the list of PNEs may include information on each PNE. The list of PNEs may be stored on the storage unit 350 or the CPNS server 230. The PN establishment management unit 320 stores information of each PNE belonging to each PN in the storage unit 350. The PNE information is included in the PN connection request, the response to the PN connection request, etc. The PN establishment management unit 320 collects the PNE information and generates the PN inventory information. An example of the PNE information is shown in Table 1 below, to the form of which the present invention is not limited.

TABLE 1

Device Capability Information

| Parameter | Value |
| --- | --- |
| Device Type | Portable Media Player |
| Network Interface | Bluetooth ® |
| Model | PMP-YEPP T10 |
| Bluetooth ® Address | 002567Axxxxx |
| Bandwidth | 1 Mbps |
| Storage | 2048 MB |
| I/O interface | Display, Mic, Speaker |
| Video Codec | H.264 |
| Audio Codec | AC3 |
| Display size | 6 × 4 inch |
| Resolution | 1024 × 768 |
| Battery | 30 wafer W |
| . . . | . . . |

An example of the PN inventory information is shown in Table 2 below, to the form of which the present invention is not limited.

TABLE 2

Personal Network #1 - Identity

PN GW Info.
PNE #1

Device Info.

| Parameter | Value |
| --- | --- |
| Device Name | Portable Media Player |
| Network Interface | Bluetooth |
| Bandwidth | 1 Mbps |
| Storage | 2048 MB |
| I/O interface | Display, Mic, Speaker |
| Video Codec | H.264 |
| Audio Codec | AC3 |
| Display size | 6 × 4 inch |
| Resolution | 1024 × 768 |
| Battery | 30 W |
| — | — |

Content Info.

| Music | Michael Jackson #8 |
| --- | --- |
| Movie | Terminator #4 |
| — | — |

PNE #2
PNE #3

Personal Network #2 - Identity

PN GW Info.
Device #1
—

When PN inventory information including information of each PNE as shown in Table 2 has been registered in the CPNS server 230, the CPNS server 230 can identify information of each PNE and can select and provide various services or content proper for each PNE. As a result, it is possible to perform or use various services or content proper for the type, specification, etc. of each PNE.

Otherwise, the PN establishment management unit 320 may register PN inventory information including only a list of PNEs except for the information of each PNE in the CPNS server 230. When the registered PN inventory information includes only a list of PNEs, the CPNS server 230 can provide the requested service/content through gateway device 200.

Figure 3:
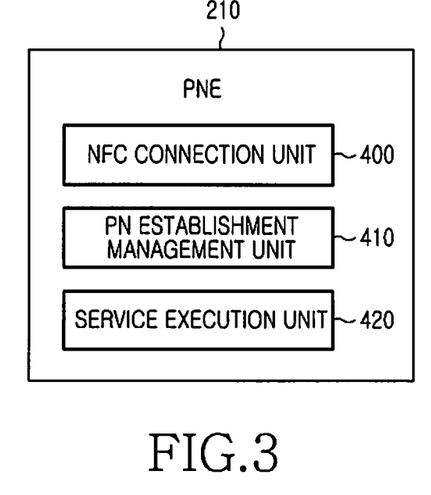
FIG. 3 is a block diagram illustrating an internal structure of a Personal Network Entity (PNE) according to an embodiment of the present invention.

Hereinafter, the construction of PNE 210 will be described with reference to FIG. 3. Referring to FIG. 3, PNE 210 includes an NFC connection unit 400 for physical connection with gateway device 200 or another PNE 220 using NFC, a PN establishment management unit 410 for searching a surrounding device operating as a gateway and transmitting a PN connection request to a found gateway device 200, thereby establishing a PN with gateway device 200 or all surrounding PNEs, and a service execution unit 420 for executing a service/content provided through gateway device 200.

Figure 4:
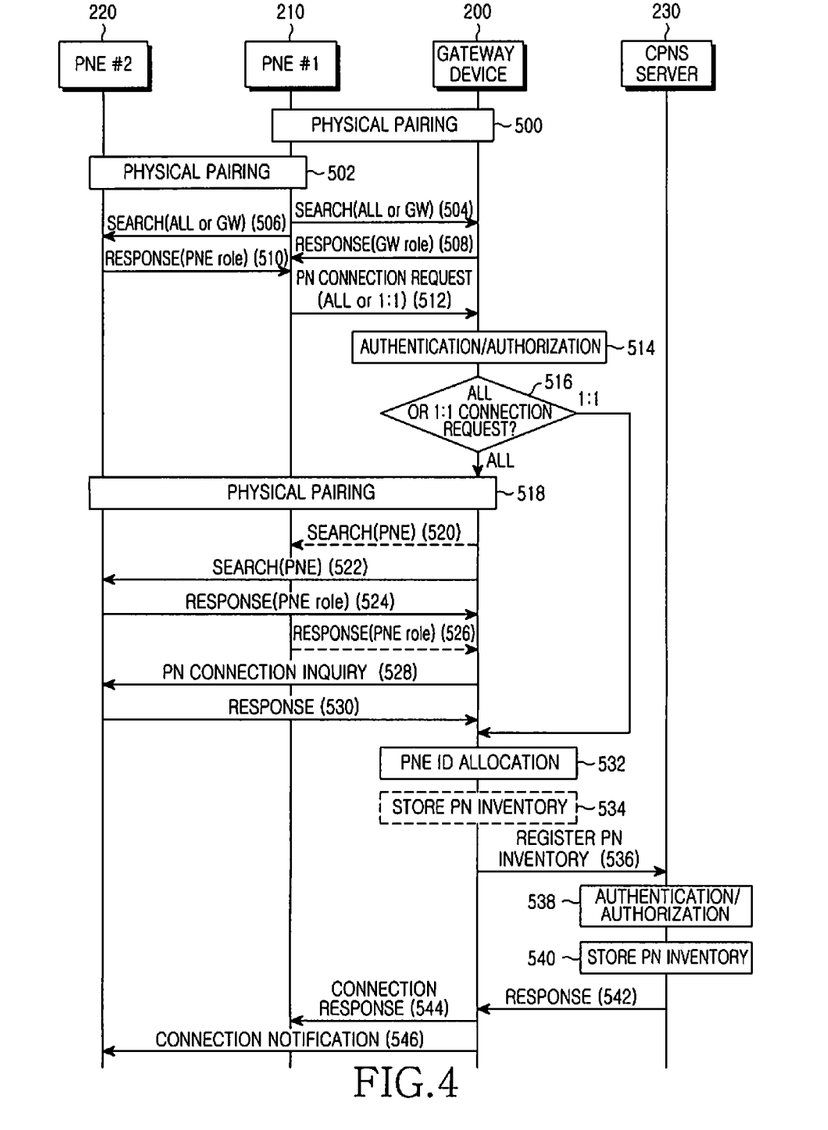
FIG. 4 is a signal flow diagram for describing a process of PN establishment and registration in a CPNS system according to an embodiment of the present invention.

Hereinafter, an operation of a CPNS system, including the elements described above, will be described with reference to FIG. 4. FIG. 4 is a signal flow diagram for describing a process of PN establishment and registration in a CPNS system according to an embodiment of the present invention.

Referring to FIG. 4, PNE 210 performs a physical pairing, that is, connection work for performing data communication with surrounding devices by using NFC technology. As used herein, a connection established between two devices before the CPNS service is provided is referred to as a physical pairing. In steps 500 and 502 of FIG. 4, PNE 210 performs the physical pairing with gateway device 200 and PNE 220, respectively, which are located around PNE 210. At this time, although PNE 210 performs the pairing with gateway device 200, PNE 210 is not yet aware that gateway device 200 is a device functioning as a gateway for connection with the CPNS server 230.

Therefore, in order to understand the functions of the surrounding devices, with which PNE 210 has paired in steps 504 and 506, that is, the modes in which the surrounding devices are operating, PNE 210 transmits a search message to PNE 220 and gateway device 200. The process of searching as described above can be called a discovery process. At this time, PNE 210 may perform either a search for identifying the modes of all the surrounding paired devices or a search for identifying only the mode of the device functioning as a gateway.

To this end, PNE 210 generates a search message including selection information, which selects between "ALL" indicating selection of all the surrounding devices and "GW" indicating selection of only the device functioning as a gateway. Specifically, each device, having received the search message including the selection information of "ALL," should make a response message including operation mode information of itself and send the response message to the device (i.e. PNE 210) having transmitted the search message. Therefore, the response message generated by PNE 220 includes "PNE role" information, for notifying of the operation mode of PNE 220, while the response message generated by gateway device 200 includes "PN GW role" information. Otherwise, the response message may include "PNE mode" information or "GW mode" information, instead of the "PNE role" information or the "PN GW role" information.

Further, the response message may include information of PNEs physically paired with gateway device 200. Therefore, PNE 210, having received the response messages in steps 508 and 510, can identify the operation modes of all the surrounding paired devices. In other words, PNE 210 can identify the operation state of each device, i.e. which device operates as the gateway device or the PNE. Further, by receiving information of PNEs physically paired with gateway device 200 also, a user of PNE 210 can previously determine if the PNEs physically paired with gateway device 200 are those which PNE 210 wants to have participate in the establishment of the personal network. Further, PNE 210 can easily determine if it will establish the personal network together with all PNEs or only by itself.

In contrast, in the case where PNE 210 has transmitted a search message including selection information of "GW", even when all the paired surrounding devices have received the search message, only the device functioning as a gateway transmits a response message. That is, the other devices except for the device functioning as a gateway need not transmit a response message. Therefore, only gateway device 200 makes and transmits a response message including "PN GW Role" information, which notifies that gateway device 200 operates as a gateway. Otherwise, all the devices may transmit a response message. In that case, each of them may transmit a negative message notifying that the device itself is not a gateway.

By receiving response messages from surrounding devices, PNE 210 can identify the device functioning as the gateway. Then, in step 512, PNE 210 transmits a PN connection request message to gateway device 200 functioning as a gateway. The PN connection request message includes PNE information as shown in Table 1 described above. That is, PNE 210 notifies gateway device 200 of information of itself when transmitting the PN connection request message.

Further, the PN connection request message includes not only the PNE information but also selection information indicating whether to establish a 1:1 PN or a PN including all surrounding PNEs. A PN connection type indicator is used for the selection information, and an indicator indicating "1:1" or "ALL" is inserted in the PN connection request message.

The "1:1" indicator indicates a request for establishment of a 1:1 PN between PNE 210 and gateway device 200. The "ALL" indicator indicates a request from PNE 210 to gateway device 200 for searching for all surrounding devices and establishment of a PN including all connectable devices. For example, when a plurality of PNEs 210 and 220 want to play an interactive game provided by the CPNS server 230 through gateway device 200, a user of PNE 210 may select the entire PN establishment scheme. As described above, through one selection by PNE 210, it is possible to establish one PN including one gateway device 200 and surrounding PNEs 210 and 220. Therefore, each PNE need not directly and individually send a PN connection request to gateway device 200, thereby saving network resources and device resources. That is, only through a single operation of PNE 210 by the user, it is possible to make all surrounding PNEs to participate in receiving a CPNS.

Upon receiving the PN connection request message, gateway device 200 performs an operation of determining if PNE 210 is a device supporting a CPNS service, an authenticating operation of determining if PNE 210 is a CPNS user, an operation of determining if it is allowed to establish a PN including gateway device 200 itself, and an authentication/authorization process in step 514. A detailed description on the authentication/authorization process may obscure the core of the present invention and will thus be omitted here.

Thereafter, in step 516, gateway device 200 determines an indicator included in the PN connection request message. As a result of the determination, when the indicator is a "1:1" indicator, gateway device 200 proceeds to step 532, in which gateway device 200 allocates an identifier (ID) to PNE 210. The allocated ID is used in order to identify PNEs belonging to the PN by gateway device 200 when another PNE wants to participate later in the PN. In contrast, as a result of the determination, when the indicator is an "ALL" indicator, gateway device 200 proceeds to step 518, in which gateway device 200 performs a pairing with all the devices surrounding gateway device 200 by using the NFC technology. As a result, gateway device 200 can identify the devices capable of receiving the CPNS. It goes without saying that a physical pairing between gateway device 200 and all surrounding devices except for PNE 210 in step 518 can be performed in advance as in step 500.

Thereafter, gateway device 200 transmits a search message to all the paired surrounding devices. The search message, which is used in order to search for PNEs around gateway device 200, includes "PNE" information notifying that it is a PNE search message. The "PNE" information implies that devices, each functioning as a PNE, are required to send a response message. As described above, since the PN may include one gateway device and a plurality of PNEs, it is okay if gateway device 200 finds devices functioning as PNEs. Although FIG. 4 shows a PNE 220 as an example of paired surrounding devices for convenience of description, it is possible to send a search message to another PNE other than the illustrated PNE 220. However, since the operation of said another PNE is identical to that of PNE 220, the following description is mainly based on PNE 220.

In transmitting the search message, gateway device 200 transmits the search message to all the physically paired PNEs 210 and 220 in steps 520 and 522. In response to the transmitted search message, each PNE 210 and 220 transmits a response message including information notifying of the operation of itself. At this time, since PNE 210 can notify gateway device 200 through a PN establishment request message that PNE 210 by itself functions as a PNE, steps 520 and 526 may be omitted.

Further, the transmission of a search message depends on the NFC technology and implementation of the functions of the gateway device 200. When it is already recognized by the NFC technology or the function of gateway device 200 that PNE 220 functions as a PNE, it is unnecessary to transmit a search message. In contrast, when it is not recognized, it is required to transmit a search message.

For example, upon receiving a response message with respect to the search message transmitted from PNE 210, it is possible to determine the devices functioning as PNEs from among the paired devices through the "PNE role" information included in the response message. Therefore, through a PN connection request message, PNE 210 can notify gateway device 200 of the device functioning as the personal entity. Then, gateway device 200 can understand the operation mode of PNE 220, and would not send a search message. Otherwise, in the case of transmitting a search message through a broadcasting to all the paired PNEs by gateway device 200, the search message is transmitted to PNE 210 also even though PNE 210 has been already paired.

Through the above process, when gateway device 200 determines that PNE 220 functions as a personal entity, gateway device 200 transmits a PN Connection ASK message, which asks PNE 220 if it will participate in the PN connection, to PNE 220. The PN Connection ASK message is different from the PN connection request message in that the PN connection request message includes information of a PNE and is delivered to gateway device 200 while the PN Connection ASK message is used when gateway device 200 sends a connection request to a PNE.

When PNE 220 has received the PN Connection ASK message and wants to participate in the PN establishment, PNE 220 transmits a response message including information of itself, i.e. PNE information as shown in Table 1, to gateway device 200 in step 530. In contrast, when PNE 220 does not want to participate in the PN establishment, PNE 220 transmits a denial response message to gateway device 200.

Upon receiving the message in step 530, gateway device 200 allocates IDs to PNEs that want to participate in the PN establishment. These IDs are used in order to identify individual PNEs by gateway device 200 when service or content is actually provided. Thereafter, in step 534 and 536, gateway device 200 stores a PN inventory including information (PNE Device Info.) of individual PNEs, information (PNE GW Info.) of the gateway device, and PN identification information (PN Identity), and transmits and registers the stored PN inventory in the CPNS server 230. Otherwise, in step 534, gateway device 200 may store PN inventory information including information of PNEs belonging to each PN, and transmit PN inventory information including only a list of PNEs except of the actual information of PNEs.

The information of the gateway device includes a gateway ID, and the gateway device information and PN identification information correspond to information, which enables the CPNS server 230 to determine which gateway device has established the PN and what type of network is the PN. The PN inventory information may include a list of PNs or a list of PNEs belonging to one PN. An example of a list of PNEs belonging to one PN is shown in Table 2.

The process shown in FIG. 4 corresponds to a case in which gateway device 200 sets PN identification information by itself and registers the PN identification information in the CPNS server 230. In this case, the CPNS server 230 should perform a repetitive PN identification information check. Otherwise, after gateway device 200 performs a PN inventory registration process, the CPNS server 230 may allocate the PN identification information by itself. In this case, the CPNS server 230 need not perform the repetition check operation of determining if the PN identification information overlaps with PN identification information of another PN. Furthermore, it is also necessary to identify gateway device 200 and the PNEs 210 and 220 by their own intrinsic property values. Therefore, the PN identification information is provided at the time of the PN inventory registration, so that the CPNS server 230 can identify them. Further, the PN inventory information may include content information processed by each PNE.

Upon receiving the PN inventory information, the CPNS server 230 searches for user information and PNEs within the PN inventory, thereby performing authentication/authorization for determining if the user is a CPNS user. Thereafter, in step 540, the CPNS server 230 stores the PN inventory information. At this time, the CPNS server 230 stores PN inventory information, including information of PNEs, or PN inventory information, including a list of PNEs, by which it is possible to understand what PNEs are included, instead of the actual information of PNEs.

In this way, the information of PNEs may be stored in gateway device 200 as in step 534 or in the CPNS server 230 as in step 540. The PN inventory information stored in the CPNS server 230 or gateway device 200 can be effectively used when a PNE belonging to a PN located from a distance tries to connect to a PNE of another PN different from its own PN. By this information, the CPNS server 230 can determine which PNE of the PN has content, what content it contains, and how to perform the routing. When the storage of the information is completed, the CPNS server 230 transmits a response message, which notifies that the PN inventory has been completely registered, to gateway device 200 in step 542.

Then, in step 544, gateway device 200 generates and transmits a response message, which notifies that the connection has been completed, to PNE 210 having transmitted the PN connection request message. Further, gateway device 200 generates and transmits a PN connection notification message to another PNE 220, which was allowed to participate in the establishment of the PN, in order to notify PNE 220 that the PN connection has been completed. At this time, if PNE 210 has requested for establishment of a 1:1 PN in a received PN connection request message, gateway device 200 transmits a response message to only PNE 210. In contrast, if PNE 210 has requested for establishment of a PN including all the PNEs, gateway device 200 notifies all the PNEs 210 and 220 of the completion of the connection.

When the PN has been established and registered as described, PNE 210 transmits a request message for a service, which PNE 210 wants to use, to gateway device 200, and gateway device 200 relays the request message to the CPNS server 230 located in an exterior network. Then, the CPNS server 230 determines the service to be used, and, based on the determination, directly provides its own service/content to gateway device 200 or makes the service/content provider 240 to provide service/content to gateway device 200. As a result, gateway device 200 or the CPNS server 230 knows information of PNE 210, PNE 210 and can execute service/content proper for its specification. Further, when PNE 210 wants to use a service together with another PNE 220, gateway device 200 or the CPNS server 230 knows information of PNE 210 and PNE 210 thus can execute the service or content proper for its specification.

In the CPNS system shown in FIG. 4 as described above, PNE 210 can choose between only PNE 210 itself and all PNEs physically paired with gateway device 200 in establishing a personal network.

Hereinafter, a process of establishing a personal network including PNEs, which want to participate in the network, from among all PNEs physically paired with gateway device 200 according to an embodiment of the present invention will be described with reference to FIG. 5.

Figure 5:
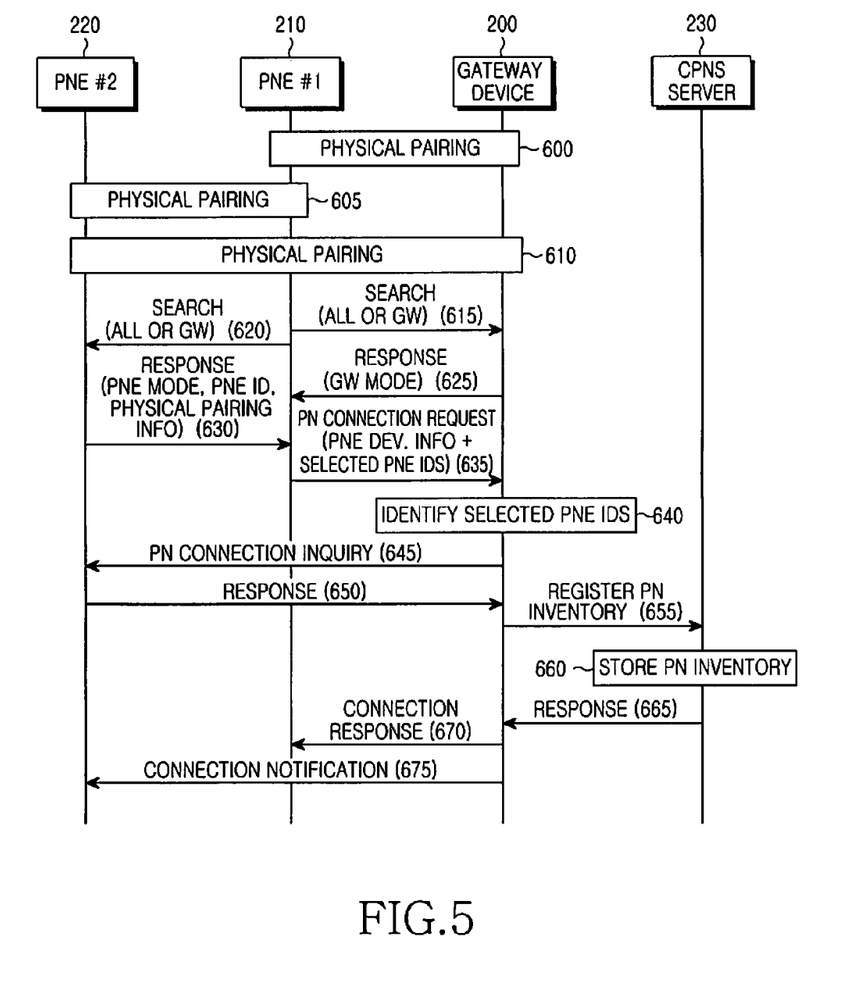
FIG. 5 is a signal flow diagram for describing a process of PN establishment and registration in a CPNS system according to another embodiment of the present invention.

First, steps 600 to 610 in FIG. 5 correspond to steps 500, 502, and 518 of FIG. 4. Briefly describing, physical pairing is performed for communication by using an NFC technology between gateway device 200 and PNEs 210 and 220 before the CPNS is provided. That is, PNE 210 performs a physical pairing with surrounding devices around itself within its NFC available area, and gateway device 200 also performs a physical pairing with surrounding devices around itself within its NFC available area. Although the description of FIG. 5 is based on an example in which PNE 210 is physically paired with PNE 220, it goes without saying that PNE 210 can also perform a physical pairing with other PNEs as well as PNE 220.

Thereafter, PNE 210 performs a discovery process in order to identify the operation mode of each physically paired device. To this end, PNE 210 transmits a search message to the physically paired devices 200 and 220 in steps 615 and 620. Such search message transmission steps as described above correspond to steps 504 and 506 for search message transmission in FIG. 4.

Upon receiving the search message, PNE 220 and gateway device 200 transmit response messages containing information of modes in which they operate. At this time, from devices functioning as PNEs from among the physically paired devices, PNE 210 receives information of the devices together with the response message. Such information includes a PNE ID and physical pairing information. For example, the information provided to PNE 210 includes the ID of PNE 220 and information of the gateway device with which PNE 220 is physically paired. Therefore, PNE 220 can provide information of the gateway device to which PNE 220 belongs, and PNE 220 can obtain information of the paired devices after the physical pairing. Further, gateway device 200 can identify IDs of PNEs belonging to gateway device 200 itself also through the discovery process.

Accordingly, in step 630, PNE 220 transmits a response message including PNE mode information, PNE ID, and physical pairing information to PNE 210. In contrast, gateway device 200 transmits a response message including GW mode information to PNE 210 in step 625.

Upon receiving the response messages from surrounding devices, PNE 210 can identify which device functions as a PNE and which device functions as a gateway, and can identify the gateway device with which PNEs paired with itself are paired. Therefore, PNE 210 can collect IDs of PNEs paired with itself and physical pairing information, and then provide the collected information to a user of PNE 210. Then, the user of PNE 210 can select only desired PNEs.

When the user has selected PNEs, PNE 210 transmits a PN connection request message to gateway device 200 in step 635. The PN connection request message includes PNE device information, PNE IDs of selected PNEs, and a PN connection type indicator. Further, PNE device information may have a format as shown in Table 1 described above.

Meanwhile, upon receiving the PN connection request message, gateway device 200 identifies the selected PNE IDs in step 640. Then, gateway device 200 transmits a PN connection ASK message to PNEs corresponding to the selected PNE IDs in step 645, and receives a corresponding response message in step 650. Steps 645 and 650 described above correspond to steps 528 and 530 of FIG. 4 and steps 655 and 675 correspond to steps 536 and 540 to 546 of FIG. 4, so a detailed description thereof is omitted here.

According to another embodiment of the present invention described above, a user of PNE 210 can establish a personal network with desired PNEs and can have an opportunity of various choices.

According to the present invention, a PNE can use a CPNS service by establishing a PN with a gateway device and registering itself in the CPNS server through the gateway device. Further, since each PNE need not establish a personal network with a gateway device one to one each time, it is possible to save the network resource and the device resource, such as battery power. Further, by using the PN inventory information, the CPNS server or the gateway device can acquire information on which PNE of the PN has content, what content it contains, and how to perform the routing, and can use the acquired information for the connection.

While the invention has been shown and described with reference to the embodiments thereof, it will be understood by those skilled in the art that various changes in form and details may be made therein without departing from the spirit and scope of the invention as defined by the appended claims.

What is claimed is:

1. A method of requesting for establishment of a Personal Network (PN) by a first Personal Network Entity (PNE), the method comprising the steps of:

performing, by the first PNE, a physical pairing with surrounding PNEs by using Near Field Communication (NFC);

discovering, by the first PNE, a gateway device, which relays a service from a server, from among the paired devices; and selecting a type of PN setup among first, second and third types of PN setups;

sending a PN setup request message including the selected type of PN setup to the gateway device, wherein each type of the PN setups indicates at least one device by which to establish a PN with the first PNE, wherein the PN is established between the first PNE and the gateway device if the type of PN setup is selected as the first type of PN setup, wherein the PN is established between the first PNE and all PNEs physically paired with the gateway device if the type of PN setup is selected as the second type of PN setup, and wherein the PN is established between the first PNE and at least one second PNE identified with respective PNE Identifications (IDs) of the PN setup message, if the type of PN setup is selected as the third type of PN setup.

2. The method of claim 1, wherein the first PNE and all the surrounding PNEs are electronic devices capable of providing a Converged PN Service (CPNS), and the gateway device includes a communication module capable of performing a communication with an external network in order to provide the service from the server existing in the external network.

3. The method of claim 1, wherein the PN setup request message includes information of the first PNE.

4. The method of claim 3, wherein the PN is established between the first PNE and at least one second PNE identified with respective PNE Identifications (IDs) of the PN setup message, if the type of PN setup is selected as the third type of PN setup, the PN setup request message further includes an identifier of the at least one second PNE selected by the first PNE.

5. The method of claim 1, wherein discovering the gateway device comprises:
selecting one of a searching scheme of searching for the gateway device from the paired surrounding PNEs and a searching scheme of searching for a mode of all the paired surrounding PNEs; and
transmitting a search message according to the selected searching scheme.

6. The method of claim 5, further comprising, when the searching scheme of searching for the gateway device from the paired surrounding PNEs has been selected, receiving a response message including at least one of information from only the gateway device, which notifies that the gateway device functions as a gateway, and information of all physically paired personal network entities.

7. The method of claim 5, further comprising:
when the searching scheme of searching for a mode of all the paired surrounding PNEs has been selected, receiving response messages from all the paired PNEs;
determining a PNE, which has transmitted a response message notifying that it functions as the gateway, from among the PNEs having transmitted the response messages as the gateway device; and
determining PNEs, each of which has transmitted a response message notifying that it operates as a PNE, from among the PNEs having transmitted the response messages as the PNEs.

8. The method of claim 1, wherein the PN setup request message indicates a selection between an amount and a function of at least one PNE to be connected in a PN with the first PNE.

9. A method of establishing a Personal Network (PN) by a gateway device, the method comprising the steps of:
receiving a first PN setup request message from a first Personal Network Entity (PNE) among PNEs physically paired;
checking a type of PN setup included in the first PN setup request message among first, second and third types of PN setups, wherein each type of the PN setups indicates at least one device by which to establish a PN with the first PNE;
if the type of PN setup is checked as the first type of PN setup for establishing a PN between the first PNE and the gateway device, establishing a PN with the first PNE;
if the type of PN setup is checked as the second type of PN setup for establishing a PN with all PNEs physically paired with the gateway device, transmitting a second PN setup request message to the all PNEs; and
if the type of PN setup is checked as the third type of PN setup for establishing a PN with at least one second PNE to be invited, transmitting a third PN setup request message to the at least one second PNE identified with the respective PNE IDentifiers (IDs) of the first PN setup request message received from the first PNE.

10. The method of claim 9, wherein the first PN setup request message comprises information of the first PNE.

11. The method of claim 10, wherein the first PN setup request message further comprises an identifier of the at least one second PNE to be invited by the first PNE.

12. The method of claim 9, further comprising:
in response to the first type of PN setup for establishing the PN between the first PNE and the gateway device, generating PN inventory information by using information of the paired PNEs; and
registering the generated PN inventory information in a server.

13. The method of claim 9, wherein the PN setup request message indicates a selection between an amount and a function of at least one PNE to be connected in a PN with the first PNE.

14. A Personal Network (PN) establishment requesting apparatus comprising:
an interface unit for performing a physical pairing with surrounding Personal Network Entities (PNEs); and
a controller for:
discovering a gateway device, which relays a service from a server, from among the paired PNEs, and
selecting a type of PN setup among first, second and third types of PN setups;
sending a PN setup request message including the selected type of PN setup to the gateway device,
wherein each type of the PN setups indicates at least one device by which to establish a PN with the apparatus,
wherein the PN is established between the apparatus and the gateway device if the type of PN setup is selected as the first type of PN setup,
wherein the PN is established between the apparatus and all PNEs physically paired with the gateway device if the type of PN setup is selected as the second type of PN setup, and
wherein the PN is established between the apparatus and at least one second PNE identified with respective PNE Identifications (IDs) of the PN setup message if the type of PN setup is selected as the third type of PN setup.

15. The PN establishment requesting apparatus of claim 14, wherein the controller controls the interface unit to receive the service or content from the server existing in an external network through the gateway device and execute the received service or the content.

16. The PN establishment requesting apparatus of claim 14, wherein the PN establishment requesting apparatus and all the surrounding PNEs are Consumer Electronics (CE) devices capable of providing a Converged PN Service (CPNS), and the gateway device includes a communication module capable of performing a communication with the external network.

17. The PN establishment requesting apparatus of claim 14, wherein the PN setup request message indicates a selection between an amount and a function of at least one PNE to be connected in a PN with the first PNE.

18. A gateway device comprising:
A Near Field Communication (NFC) connection unit for receiving a first PN setup request message from a first Personal Network Entities (PNE) among PNEs physically paired; and
a controller for,
checking a type of PN setup included in the first PN setup request message among first, second and third types of PN setups, wherein each type of the PN setups indicates at least one device by which to establish a PN with the first PNE,
if the type of PN setup is checked as the first type of PN setup for establishing a PN between the first PNE and the gateway device, establishing the PN with the first PNE,
if the type of PN setup is checked as the second type of PN setup for establishing the PN with all PNEs physically paired with the gateway device, transmitting a second PN setup request message to the all PNEs, and
if the type of PN setup is checked as the third type of PN setup for establishing the PN with at least one second PNE to be invited, transmitting a third PN setup request message to the at least one second PNE identified with respective PNE IDentifiers (IDs) of the first PN setup request message.

19. The gateway device of claim 18, wherein the controller controls the interface unit to perform a communication with a server existing in an external network in order to relay a service from the server to said at least one PNE.

20. The gateway device of claim 19, wherein, if the type of PN setup is checked as the first type of PN setup for establishing the PN between the first PNE and the gateway device, the controller generates PN inventory information by using information of the paired PNEs, and registers the generated PN inventory information in the server.

21. The gateway device of claim 19, wherein the PN setup request message indicates a selection between an amount and a function of at least one PNE to be connected in a PN with the first PNE.

* * * * *